United States Patent
Troia et al.

(10) Patent No.: US 11,477,030 B2
(45) Date of Patent: Oct. 18, 2022

(54) METHOD FOR IMPROVING SAFETY OF A COMPONENT OR SYSTEM RUNNING A FIRMWARE OR A FINITE STATE MACHINE

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 383 days.

(21) Appl. No.: 16/624,070

(22) PCT Filed: Feb. 22, 2019

(86) PCT No.: PCT/IB2019/000089
§ 371 (c)(1),
(2) Date: Dec. 18, 2019

(87) PCT Pub. No.: WO2020/169997
PCT Pub. Date: Aug. 27, 2020

(65) Prior Publication Data
US 2021/0344499 A1     Nov. 4, 2021

(51) Int. Cl.
*G06F 21/52*     (2013.01)
*H04L 9/32*      (2006.01)
(Continued)

(52) U.S. Cl.
CPC .......... *H04L 9/3239* (2013.01); *G06F 11/302* (2013.01); *G06F 11/3409* (2013.01);
(Continued)

(58) Field of Classification Search
CPC .......................... G06F 21/52; G06F 2221/033
See application file for complete search history.

(56) References Cited

U.S. PATENT DOCUMENTS

2010/0146624 A1* 6/2010 Meyer ............... G06F 11/28
                                                          726/22
2011/0302651 A1   12/2011 Bates
(Continued)

FOREIGN PATENT DOCUMENTS

EP          1843250 A1     10/2007

OTHER PUBLICATIONS

Wang et al. ConFirm: Detecting Firmware Modifications in Embedded Systems using Hardware Performance Counters Nov. 2-6, 2015 2015 IEEE/ACM International Conference on Computer-Aided Design (ICCAD) (Year: 2015).*

(Continued)

*Primary Examiner* — David J Pearson
(74) *Attorney, Agent, or Firm* — Brooks, Cameron & Huebsch, PLLC (57) ABSTRACT

The present disclosure relates to analyzing a firmware or a finite state machine, decomposing the same into a plurality of routines or states, individuating significative instructions or states, associating each significative instruction or state with a watchpoint, calculating first HASH values of the watchpoints using a HASH function before running the firmware or finite state machine for all allowable paths in the firmware or finite state machine corresponding to a correct working of the same, storing the set of first HASH values as calculated, calculating second HASH values of the watchpoints using a HASH function when running of the firmware or finite state machine, comparing the second HASH value of each watchpoint as calculated with the stored set of first HASH values, and validating the instruction or state of a watchpoint as correct if its second HASH value is comprised in the first HASH values of the allowed paths.

19 Claims, 8 Drawing Sheets

(51) Int. Cl.
  *G06F 11/30*    (2006.01)
  *G06F 11/34*    (2006.01)
  *G06F 11/36*    (2006.01)
  *G06F 21/57*    (2013.01)
  *H04L 9/06*     (2006.01)
  *H04L 9/00*     (2022.01)

(52) U.S. Cl.
  CPC .......... *G06F 11/3612* (2013.01); *G06F 21/52* (2013.01); *G06F 21/572* (2013.01); *H04L 9/0643* (2013.01); *G06F 2221/033* (2013.01); *H04L 9/50* (2022.05)

(56) References Cited

U.S. PATENT DOCUMENTS

| | | | | |
|---|---|---|---|---|
| 2013/0332908 A1* | 12/2013 | Stall | ........................ | G06F 11/36 |
| | | | | 717/125 |
| 2014/0108812 A1* | 4/2014 | Wolf | ........................ | G06F 21/51 |
| | | | | 713/187 |
| 2014/0325239 A1* | 10/2014 | Ghose | .................... | H04L 9/3247 |
| | | | | 713/190 |
| 2016/0248589 A1* | 8/2016 | Potlapally | .............. | H04L 9/3242 |
| 2017/0031750 A1* | 2/2017 | Wenn | ..................... | G06F 9/4843 |
| 2020/0125732 A1* | 4/2020 | Iyer | ........................ | G06F 21/577 |

OTHER PUBLICATIONS

International Search Report and Written Opinion from related international application No. PCT/IB2019/000089, dated Oct. 21, 2019, 17 pages.

\* cited by examiner

FIG. 1

```
void BMS_Availability(void)
{
    unsigned char BMS_Row;
    if (MASKED_PEEK(BDBMSALMOSTFULL_A, BDBMSALMOSTFULL_D)
    {
                   SET_LDBIT(LDBMUOSCON) ;
WP#0  →   //ASM:   1f66   8c502  set 0x45, 0x02

// etc...etc...
                   for (BMS_Row = BMSRDMAX; BMS_Row | =0; BMS_Row--)
          //ASM:   1f6b   d2005  mov r0, 0x05
          {
                                // etc...etc...
                   SET_LDBIT(LDBMUINCADD);
          //ASM:   1f7c   8e202  set 0x62, 0x02
          }
          //ASM:   1f85   90001  sub r0, 0x01
          //ASM:   1f86   92000  cmpsub r0, 0x00
          //ASM:   1f87   0bfe5  jmp nz, 0x1f6c // etc...etc...
                   return (WL_YES);
WP#1  →   //ASM:   1f8b   d2000  mov r0, 0x01
          //ASM:   1f8c   04000  return
    }
// etc...etc...
          return (WL_NO);
          //ASM:   1f9b   d2000  mov r0, 0x00
WP#2  →   //ASM:   1f9c   04000  return       ← INSTR
}                   ↑
                    PC
```

METHOD FOR IMPROVING SAFETY OF A COMPONENT OR SYSTEM RUNNING A FIRMWARE OR A FINITE STATE MACHINE

This application is a National Stage Application under 35 U.S.C § 371 of International Application Number PCT/IB2019/000089, filed Feb. 22, 2019, the entire contents of which are incorporated herein by reference.

TECHNICAL FIELD

The present disclosure relates generally to components or systems running a firmware or a finite state machine that implements the responses of certain internal or external events, in particular in vehicles, and more particularly to a method for improving safety of such components or systems. Even more particularly, the present disclosure relates to a method for evaluating a firmware or a finite state machine to improve safety of a component or system running the same by avoiding the triggering of wrong or inconsistent instructions leading to potentially dangerous situations.

BACKGROUND

A task of a component or a system can be executed by running a firmware or a finite state machine, that implements the responses of certain internal events, tied to the working of the component or system, or external events, in particular gathered by sensors.

For instance, motor vehicles, such as autonomous and/or non-autonomous vehicles (e.g., automobiles, cars, trucks, buses, etc.), can nowadays use sensors, cameras, and communication means to obtain information about their surroundings. Similarly, sensors are used in many other fields, such as in airplanes or in plants comprising one or more machinery managed by a control system.

Moreover, different conditions can be used to trigger specific function or to ascertain the begin/end of different state during the working of the component or system. For instance, a specific temperature can be sensed in order to ensure that a threshold value is attained before using a function or component or to end such a use.

In a general way, a component or a system can execute one or more task by using:
- a firmware, in the form of a program in a high level language, such as C++ and/or other custom languages, being compiled to obtain an assembly code executed by a microprocessor; or
- a finite state machine or FSM, usually defined in VHDL, Verilog, SystemC, or represented by a diagram of states being mapped on a programmable logic or FPGA or by an ASIC.

It is immediate to verify that, in most cases, a firmware and a finite state machine show a large amount of analogies with one another. In particular, they can be essentially seen as a set of transitions between states/routines following specific instructions triggered by internal and/or external events, such as:
- analog events (voltage values, current values, timing); and
- logical events (Boolean functions of some external/internal signals).

When using a firmware or a finite state machine, care should be taken in order to avoid the activation of wrong or inconsistent signals and thus unwanted or inconsistent instruction that can lead to very dangerous situations.

In this sense, the transitions among the states of a finite state machine or the steps of the routines of a firmware not allowed on the basis of a correct working of the corresponding component/system running the firmware/finite state machine should be prevented so as to avoid unauthorized access to the component/system or a portion thereof following a hacking attack.

These problems are particularly important for autonomous vehicles, i.e. vehicles in which at least a portion of the control over vehicle operations is managed by computer hardware and/or software/firmware, as opposed to a human operator. In fact, an autonomous vehicle can be a driverless vehicle, a computerized system managing the entire working of the vehicle and the safe and correct running of its firmware/finite state machine being of the utmost importance.

It is desirable to solve the above-mentioned problems, providing a secure and efficient method for ensuring the correct working of a component or system running a firmware or a finite state machine, especially able to avoid the triggering of wrong or inconsistent signals that can lead to unwanted or even dangerous situations.

DETAILED DESCRIPTION

With reference to those figures, a method for improving safety of a component or system running a firmware or a finite state machine will be disclosed herein.

More particularly, as it will be described into details in the following, the proposed method is aimed to avoid the triggering of wrong or inconsistent signals leading to potentially dangerous situations by detecting anomalous sequences of routines or states in a firmware or in a finite state machine during their execution.

An example method includes the steps of:
- analyzing a firmware or a finite state machine, decomposing the same into a plurality of routines or states and individuating significative instructions or states;
- associating each significative instruction or state with a watchpoint;

calculating first HASH values of the watchpoints by means of a HASH function before running the firmware or finite state machine for all allowable paths in the firmware or finite state machine corresponding to a correct working of the same;

storing the set of first HASH values as calculated;

calculating second HASH values of the watchpoints by means of a HASH function when running of the firmware or finite state machine;

comparing the second HASH value of each watchpoint as calculated with the stored set of first HASH values; and validating the instruction or state of a watchpoint as correct if its second HASH value is comprised in the set of first HASH values of the allowed paths.

In an embodiment, the significative instructions or states may be begin/end instructions of routines of the firmware or specific executions states of the finite state machine.

Moreover, the HASH function may be the cryptographic HASH function or Secure Hash Algorithm SHA-256.

Another example method according to the present disclosure comprises the steps of:

analyzing a sequence of instructions and individuating significative ones;

associating each significative instruction with a watchpoint;

calculating first unique values of the watchpoints by means of a predefined function before executing the sequence of instructions for all allowable paths in the sequence of instructions corresponding to a correct working of the same;

storing the set of first unique values as calculated;

calculating second unique values of the watchpoints by means of a predefined function when executing the sequence of instructions;

comparing the second unique value of each watchpoint as calculated with the stored set of first unique values; and validating the instruction of a watchpoint as correct if its second unique value is comprised in the first unique values of the allowed paths.

Another example method according to the present disclosure comprises the steps of:

calculating, based on a predefined function, a current unique value of a watchpoint associated to a significative instruction when executing a sequence of instructions;

comparing the current unique value of the watchpoint as calculated with a set of stored unique values; and validating the instruction of the watchpoint as correct if its current unique value is comprised in the set of stored unique values.

The present disclosure also relates to a simple component or a more complex system, generally indicated as component implementing the above method.

More particularly, the component implementing the above method may comprise:

means for calculating HASH values associated to watchpoints of significative instructions or states of the firmware or finite state machine by means of a HASH function, the means for calculating HASH values calculating first HASH values before running the firmware or finite state machine and second HASH values when running the firmware or finite state machine;

means for storing the set of first HASH values as calculated;

means for comparing the second HASH value of each watchpoint as calculated with the stored set of first HASH values; and means for validating the instruction or state of a watchpoint as correct if its second HASH value is comprised in the set of first HASH values of the allowed paths.

The disclosure further relates to an apparatus comprising:

a component configured to run a firmware or a finite state machine;

means for storing the firmware or finite state machine;

a plurality of sensors connected to the component and configured to provide thereto input signals; and a plurality of actuators connected to the component and configured to receive therefrom control signals, the component including:

means for storing a set of first HASH values;

means for calculating HASH values associated to watchpoints of significative instructions or states of the firmware or finite state machine by means of a HASH function, the means for calculating HASH values being configured to calculate second HASH values when the component is running the firmware or finite state machine;

means for comparing the second HASH value of each watchpoint as calculated with the stored set of first HASH values; and means for validating the instruction or state of a watchpoint as correct if its second HASH value is comprised in the set of first HASH values.

The method can be used for enhancing the safety of a component or a system using a firmware or a finite state machine (FSM) indifferently.

The method essentially provides for individuating significative instruction/states in a firmware/finite state machine and associating the same with respective watchpoints, then using a HASH function to evaluate a correctness of different sequences of instruction/states during the running of the firmware/finite state machine. The method provides for verifying if an instruction/state following a current instruction/state is among a plurality of correct instructions/states on the basis of the original programming of the corresponding firmware/finite state machine, the correct instructions/states that could follow each instruction/state of the firmware/finite state machine being previously stored.

It is noted that, although a preferred embodiment will be described wherein the firmware or finite state machine is used in an apparatus being a vehicle, such as a private vehicle or also a vehicle intended to transport people and/or goods, the present disclosure is not limited thereto and can be also used in other environments or apparatuses, such as in an airplane or in a control system of a plant, such as, for example, a car factory, a chemical plant, a power plant or any other type of factory.

A finite state machine essentially comprises a plurality of states, each state being executed following a transition from a previous state. Similarly, a firmware essentially comprises a plurality of routines and corresponding instructions to begin/end them. In this way, it is clear that the states of a finite state machine could be considered as equivalent to the instructions to begin/end a routine of a firmware.

When dealing with a component/system running a firmware or a finite state machine, Single Event Upsets (SEUs) or Multiple Event Upsets (MEUs) should be taken into account, being able to trigger unwanted or incorrect instructions or execution of states of the firmware/finite state machine, leading to the activation of some wrong or inconsistent signals for the component/system itself. The activation of wrong or inconsistent signals can in turn lead to very dangerous situation, such as for example:

in a vehicle, the activation of the brake and throttle system at the same time;

in an airplane, the opening of the landing gear, during cruising; or in a control system of a plant, the activation of some actuators that contrast the activity of others still running.

With the wording "event upset" it is indicated herein any kind of internal or external action or unwanted/unforecasted event leading to unwanted instructions within a routine of a firmware or transitions between states of a finite state machine.

This is the case, for instance, of a change of state caused by an ionizing particle (ions, electrons, photons . . . ), that can be from x-ray, power lines on top of roads, alpha-particles, etc., striking a sensitive node in a micro-electronic device, such as in a semiconductor memory. The free charge so created by ionization in or close to an important node of a logic element (e.g. memory "bit") can cause an unwanted state change and a corresponding error in a corresponding component or system output or operation, also called soft error.

Making reference to the automotive field, event upsets can occur for instance when a vehicle runs in the vicinity of a generator of electrical noise, such as a radio station plant or high voltage air cables.

Event upsets can also be caused, for instance, by the malfunctioning of a single device in the component/system or by an erroneous string of commands provided by a user or also by an attempt of hacking the component/system, usually involving fraudulently changing of the power supplies values. In a general way, event upsets can be accidentally or purposely provoked.

In essence, an event upset could deviate the correct working of a firmware, in term of sequences of routines, or of a finite state machine, in term of transitions between states, from their original and correct programming, such a deviation being for instance a jump into a routine/state that is not one among the possible correct routines/states that can follow a current one according to the working established a priori for the firmware or finite state machine, such an unforeseen routine/state leading to a malfunctioning of the firmware or finite state machine and thus of the component or system comprising it.

Different other dangerous situations could raise in case of a triggering of wrong or inconsistent signals and it is thus important to detect anomalous sequences of states/routines that can lead to incoherent situations so as to avoid them.

In the automotive field, methods for testing the integrity of a firmware or finite state machine are provided, for instance, among the safety requirements, based on ISO 26262 for Automotive; it should be remarked that the standard gives recommendation to associate a probability of error, i.e. the so called ASIL level (Automotive Safety Integrity Level), and it does not provide indication on how implement the interception and the action to be done when an error is detected, these choices being left to the developer.

More particularly, the integrity tests are performed:

during the upgrading of the firmware or finite state machine;

during the loading of the firmware or finite state machine in a corresponding component/system ram able to start the execution of the same; and during the execution of a firmware instruction or a finite state machine state.

The method according to the present disclosure detects bad firmware or finite state machine behaviors by evaluating the firmware or finite state machine structure or diagram and in particular the different routines and instructions or states and transitions composing the same in order to select specific instructions/states wherein inserting corresponding watchpoints to be checked during the running of the firmware or finite state machine.

More particularly, the method comprises a preliminary step of evaluating the firmware or finite state machine structure decomposing the same into a plurality of states/routines and instructions and selecting a plurality of significant instructions/states of interest. For instance, inside a firmware, the begin/end instructions of the routines could be selected as significative instructions, while in a finite state machine, specific executions states could be selected as significative states.

The method then comprises a step of associating a watchpoint to each of the selected significative instructions/states.

The method according to the present disclosure provides for calculating a HASH value corresponding to each watchpoint by means of a HASH function.

A HASH function is a function that is used to map data of arbitrary size into data of a fixed size, returning values being called HASH values. More particularly, a HASH function always provides a result value, also indicated as digest, of a fixed length, starting from an initial data or message of variable length. Moreover, HASH functions are usually not reversible, so that an original data or value cannot be retrieved by the HASH value alone.

It is also not possible to create two different HASH results having a same value starting from different inputs. In this sense, the HASH functions are claimed as having no collisions, also indicated as HASH collision.

Suitably according to the present disclosure, the method comprises a first step of calculating first HASH values of all the watchpoints of the firmware or finite state machine before running the same, herein also indicated as initial HASH values or Golden HASH values or G-HASH values, indifferently.

The HASH value of each watchpoint is calculated so as to depend only from an allowable path in the firmware or finite state machine, so tracking the correct execution flow of the firmware or finite state machine. In this way, the different paths between the routines/states, comprising an unknown length of branches, loops, i.e. analog timings, user inputs, and others, are providing a unique HASH value.

More particularly, thanks to the HASH values so calculated, the method allows to avoid branch track collisions during the execution of the instructions/states comprised in a corresponding path within the firmware or finite state machine, a fixed size value being calculated for each end point.

It is remarked that the HASH functions provide HASH values having a fixed size being known a priori and allow to associate even very long path to a unique HASH value of a fixed size, indeed. In other words, independently from the length of the processed data, the HASH function always output a fixed size result value.

According to an embodiment, the method exploits a cryptographic HASH functions, more particularly a Secure Hash Algorithm, or SHA. The SHAs are cryptographic HASH functions published by the National Institute of Standards and Technology (NIST) as a U.S. Federal Information Processing Standard (FIPS), the list of allowed HASH functions being regularly updated, while keeping the same size.

According to an embodiment, the SHA-256 is used, providing HASH values having a size of the 32 Bytes and having not shown any collision from its conception up to now.

According to an embodiment of the present disclosure, the first step of calculating the first or G-HASH values is performed for a firmware during a compiling phase and for a finite state machine during a synthesis phase, i.e. according to an original programming of the same, the first or G-HASH values corresponding to all the possible allowable paths to reach an end point of the firmware or finite state machine from a defined starting point. In other words, the first or G-HASH values map the correct paths allowed for the firmware or finite state machine before running them in a component/system, more particularly, the first or G-HASH values form a tree wherein the watchpoints are connected one another in a correct manner. The tree of first or G-HASH values in particular shows all possible watchpoints (i.e. the correct ones) that could follow a selected watchpoint, being considered as a starting point, on the basis of the correct working programmed for the firmware or finite state machine under examination.

The method also comprises a step of storing the set of first or G-HASH values as calculated. In particular, a database of possible allowable HASH values is generated, being the values that can appear during the runtime of the firmware or finite state machine under examination.

It should be remarked that the first of G-HASG values are stored in a permanent way in the corresponding component/system implementing the method. In fact, such first or G-HASH values are changed only when a new firmware or finite state machine is compiled and sent for update.

Moreover, the method comprises a second step of calculating second HASH values of each watchpoint during the execution of the firmware or finite state machine using a same HASH function; the second HASH values are herein also indicated as Executable HASH or E-HASH values.

The method then comprises a step of comparing the set of first HASH values as stored and the second HASH values as calculated, in particular the G-HASH and E-HASH values respectively, the presence of a second or E-HASH value as calculated in the stored set of first or G-HASH values indicating a correct execution of the firmware or finite state machine under evaluation, the method then validating the corresponding instruction or state as correct.

Such a comparison is usually made starting from the first watchpoint in the runtime, while it can start from any watchpoint in the debug and/or validation procedures of the firmware or a finite state machine.

Suitably, the method further comprises a step of calculating cumulated HASH values, also indicated as FT_HASH, of a sequence of instructions/routines or transitions/states by linking the HASH value of a watchpoint under examination (watchpoint WP #i) to the HASH value of the previous watchpoints according to the following formula:

$$FT\_HASH_k = HASH[FT\_HASH_{k-1} | HASH(\text{watchpoint WP \#i})], \text{being}$$

k the current clock period;
k−1 the previous clock period; and
| the union between HASH values,
starting from an initial value $FT\_HASH_0 = HASH(\text{watchpoint WP \#0})$, being watchpoint WP #0 the starting point of a chain of watchpoints under examination, the cumulated HASH value being thus calculated by applying the HASH function at each step of the routines of a firmware or at each transition between states of a finite state machine.

A current or E-HASH value of an end watchpoint of the chain would thus correspond to the last cumulated FT_HASH as calculated following such a chain.

In this way, with the method according to an example of the disclosure, the information relating to a watchpoint in a chain of the tree of watchpoints forming the firmware or finite state machine is linked to the information of the watchpoint being upstream in the chain through the cumulated FT_HASH as calculated, such link being made by the HASH function so as to always obtain a result with a fixed size known a priori. In other words, the cumulated FT_HASH contains the history of steps to reach at a certain instruction/state of the firmware or finite state machine under examination.

Suitably, the method further comprises a step of storing the different cumulated HASH values as calculated for each watchpoint being examined.

Finally, the method may also comprise a step of outputting the result of the comparison step between the G-HASH and E-HASH values for indicating a wrong or potentially dangerous sequence of instructions or states for the firmware or finite state machine under examination.

More particularly, the method may output a warning signal for a hypervisor or a user or for internal handling of the sequence of instructions or states of the firmware or finite state machine under examination.

As it will be explained in the following, the HASH value of a watchpoint is calculated by using the program counter value of the corresponding instruction for a firmware or the status for a finite state machine.

Figure 1:
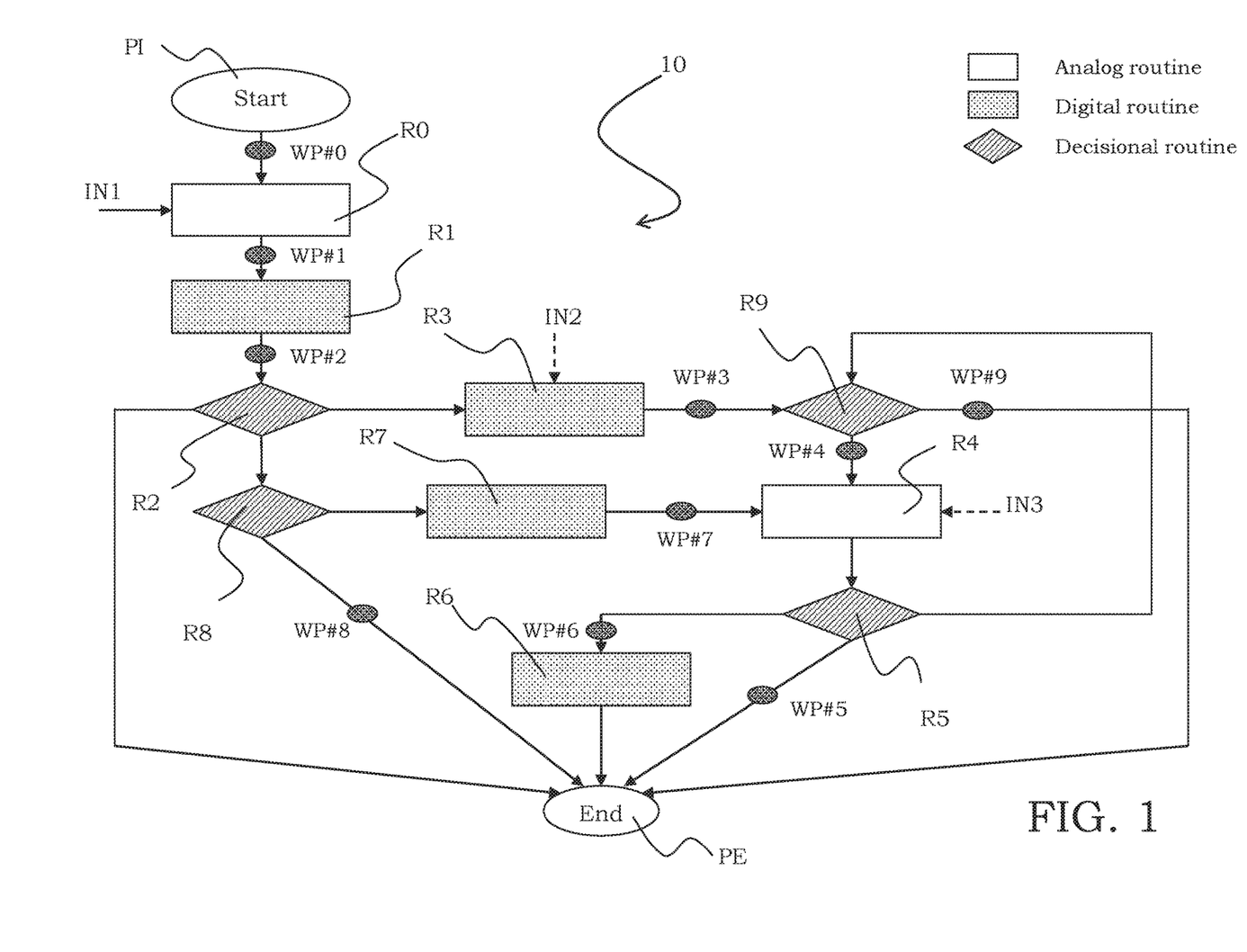
FIG. 1 shows a block diagram of a firmware implementing a method in accordance with an embodiment of the present disclosure.

FIG. 1 is a block diagram of the structure of an example firmware 10 implementing the method according to an embodiment of the present disclosure. The firmware 10 can be used, for instance, in an autonomous vehicle, a traditional non-autonomous vehicle, an emergency vehicle, a service vehicle, or the like. As already indicated, the firmware 10 can be used, for instance, in an airplane or in a plant comprising one or more machinery.

The firmware 10 comprises at least a starting point PI, indicated also as Start and an ending point PE, indicated also as End, as well as a plurality of routines R0 . . . Rn interconnected by means of corresponding instructions.

The routines R0 . . . Rn can be analog routines, such as the first routine R0 in the figure, digital routines, such as the second routine R1 in the figure, or decisional routines, such as the third routine R2 in the figure. The first routine R0 also receive input values IN1, being provided at the start of the running of the firmware 10.

Moreover, other routines, such as the fourth routine R3 or a fifth routine R4 could receive eventual additional input values, IN2 and IN3, being for instance analog timing or timeout signals, such additional input values being unpredictable.

In particular, additional input values can be tied to external actions, such as an action from a user that could occur randomly. This is the case, for instance, of a user that could trigger the working of a specific device of a component/system running the firmware 10 by pushing a button, or of a signal provided by an internal or external sensor. Additional input values could be also provided internally by a device of the component/system running the firmware 10, such as by a counter.

It should be noted that the block diagram of FIG. 1 is a mere example and that its structure, e.g., the number and connection of routines, may be different from the one depicted in FIG. 1.

According to an embodiment of the present disclosure, the method is applied to the firmware 10 and selects a plurality of instructions connecting the routines R0 . . . Rn, then associates a corresponding watchpoint WP #0 . . . WP #n to each of the selected instructions.

More particularly, the watchpoints WP #0 . . . WP #n are suitably inserted during the design of the firmware 10. Such an insertion can be automatic (for instance based on a list) or manual (for instance based on design choices).

The corresponding first HASH values, i.e. the initial HASH value, also indicated as Golden or G-HASH values, are calculated during the generation of the firmware 10 and stored as a corresponding tree of HASH values, each HASH value being related to a watchpoint.

According to a preferred embodiment, the calculation of a first or G-HASH value of a watchpoint is given to a compiler and/or to a post script processor, the correct data at each watchpoint WP #n (in particular the correct address, the counting of the executed instruction, etc.) being thus used.

Making reference to the embodiment of FIG. 1, the example firmware 10 comprises ten routines R0 . . . R9 and ten watchpoints WP #0 . . . WP #9. More particularly, a first watchpoint WP #0 is associated to a begin instructions of the first routine R0. Similarly, second, third, fifth and seventh watchpoints WP #1, WP #2, WP #4 and WP #6 are associated to begin instructions of respective second third, fifth and seventh routines R1, R2, R4 and R6. Moreover, fourth, sixth, eighth, ninth and tenth watchpoints WP #3, WP #5, WP #7, WP #8 and WP #9 are associated to end instructions of corresponding fourth, sixth, eighth, ninth and tenth routines R3, R5, R7, R8 and R9.

Suitably, using the method according to an embodiment of the disclosure, a first HAS value or G-HASH value is calculated for each watchpoint when the firmware 10 is generated or compiled, a corresponding tree of HASH values being stored, such a tree being substantially a shot of the correct working of the firmware 10 as initially conceived or programmed.

Moreover, the method provides that a second HASH value, also indicated as Executable or E-HASH value, is calculated for a watchpoint under examination during the running of the firmware 10 and compared to the stored initial first or G-HASH values as expected to be reached after such a watchpoint according to the tree of G-HASH values as stored. The E-HASH value can be thus also indicated as the current HASH value of a watchpoint, i.e. the HASH value of such a watchpoint while the firmware 10 is running.

For the example firmware 10 of FIG. 1, the tree of initial or G-HASH values would indicate, for instance, that starting from the fourth watchpoint WP #3 a correct working of the firmware 10 could lead to the fifth watchpoint WP #4 or to the tenth watchpoint WP #9 and no other. Hence, if the current E-HASH value calculated following the fourth WP #3 during the running of the firmware 10 would correspond to the initial G-HASH values of these fifth watchpoint WP #4 or tenth watchpoint WP #9, the firmware 10 is correctly running and the working of the component/system comprising the same is in turn correct. On the contrary, if the current E-HASH value calculated following the fourth WP #3 during the running of the firmware 10 would correspond, for instance, to the initial G-HASH value of the ninth watchpoint WP #8, an error has occurred when running the firmware 10 and the working of the corresponding component/system is not correct and could potentially lead to a dangerous situation. In such an event, an alert is provided so that a corrective action may be taken.

Figure 2:
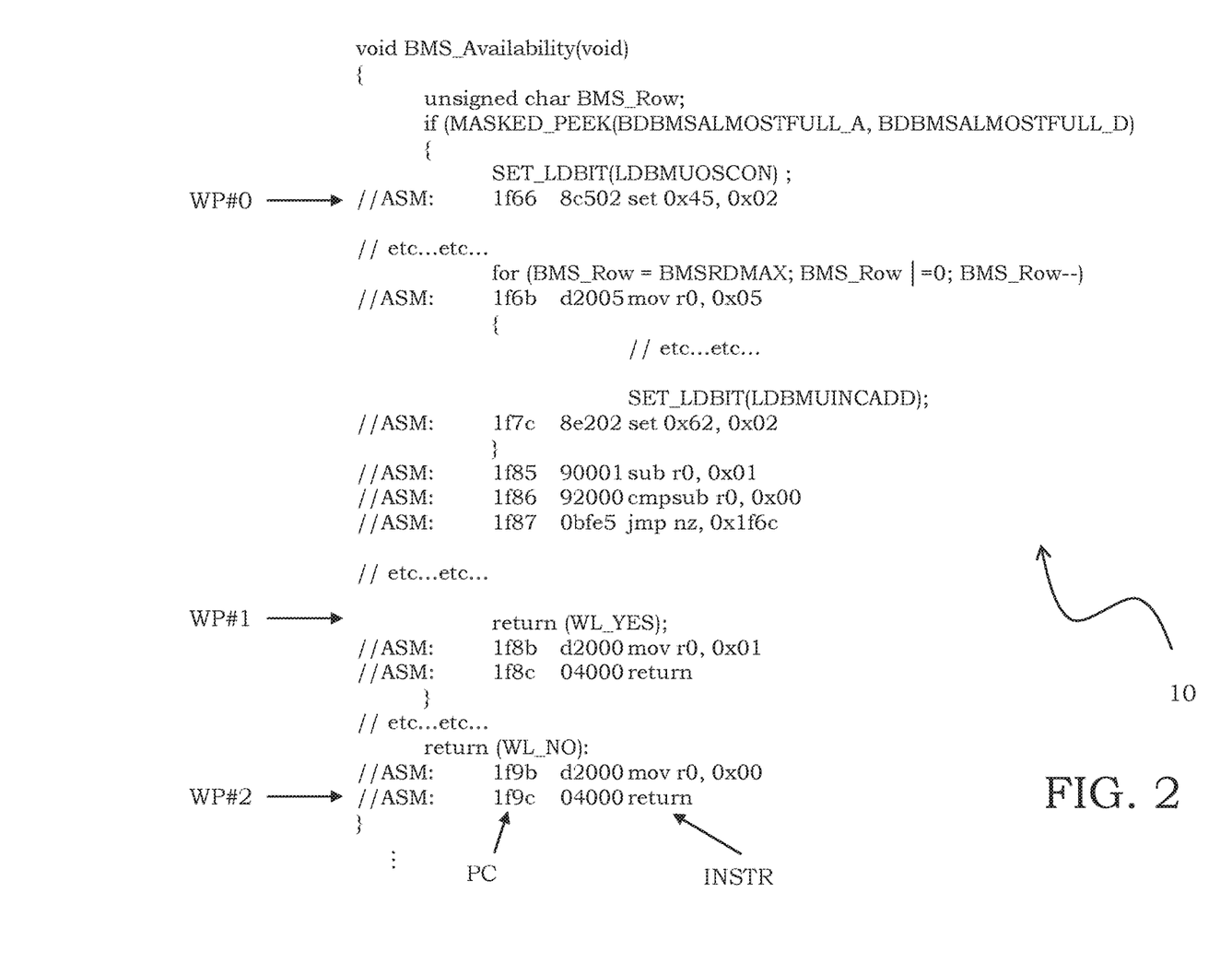
FIG. 2 shows a portion of a routine of the firmware of FIG. 1 as modified by the method in accordance with an embodiment of the present disclosure.

A portion of the firmware 10 is shown in FIG. 2, in particular the sequence of steps of the first, second and third routines R0, R1 and R2 and the associated first, second and third watchpoints WP #0, WP #1 and WP #2. The portion of firmware 10 reported in FIG. 2 is an example portion and it will be clear how to apply the disclosure to other different portions.

Suitably, the method according to an embodiment of the disclosure when dealing with a firmware, such as the firmware 10 of FIG. 1, applies the selected HASH function to the program counter PC which is usually associated to a corresponding instruction INSTR of the firmware 10, as indicated in FIG. 2. It is in fact clear that an information tied to the position attained by the firmware during its running, and thus the corresponding routine being executed, could be easily derived from the program counter PC.

The method also provides for the calculation of cumulated HASH values (or FT_HASH) of a sequence of instructions and routines by linking the HASH value of a watchpoint under examination (watchpoint #i) to the HASH value of the previous watchpoints according to the following formula:

$FT\_HASH_k = HASH[FT\_HASH_{k-1} | HASH(\text{watchpoint } \#i)]$, being k the current clock period;
k−1 the previous clock period; and
| the union between HASH values,
starting from an initial value $FT\_HASH_0 = HASH(\text{watchpoint WP \#0})$, being watchpoint WP #0 the starting point of a chain of watchpoints under examination, wherein $HASH(\text{watchpoint WP } \#i) = HASH(\text{program counter PC})$ It is remarked that the program counter PC suitably allows to link each watchpoint WP #i to a specific instruction within a routine in the code of the firmware 10.

As already explained, the method according to an embodiment of the disclosure can be applied also to a finite state machine. An example finite state machine is shown in FIG. 3A.

As already indicated, the finite state machine comprises a plurality of states and a corresponding plurality of transition between states and the method according to an embodiment of the disclosure comprises a preliminary step of evaluating the finite state machine structure and selecting a plurality of significant states of interest, to be then associates to corresponding watchpoints. In particular, the watchpoints are inserted during the design of the finite state machine.

Figures 3A, 3B:
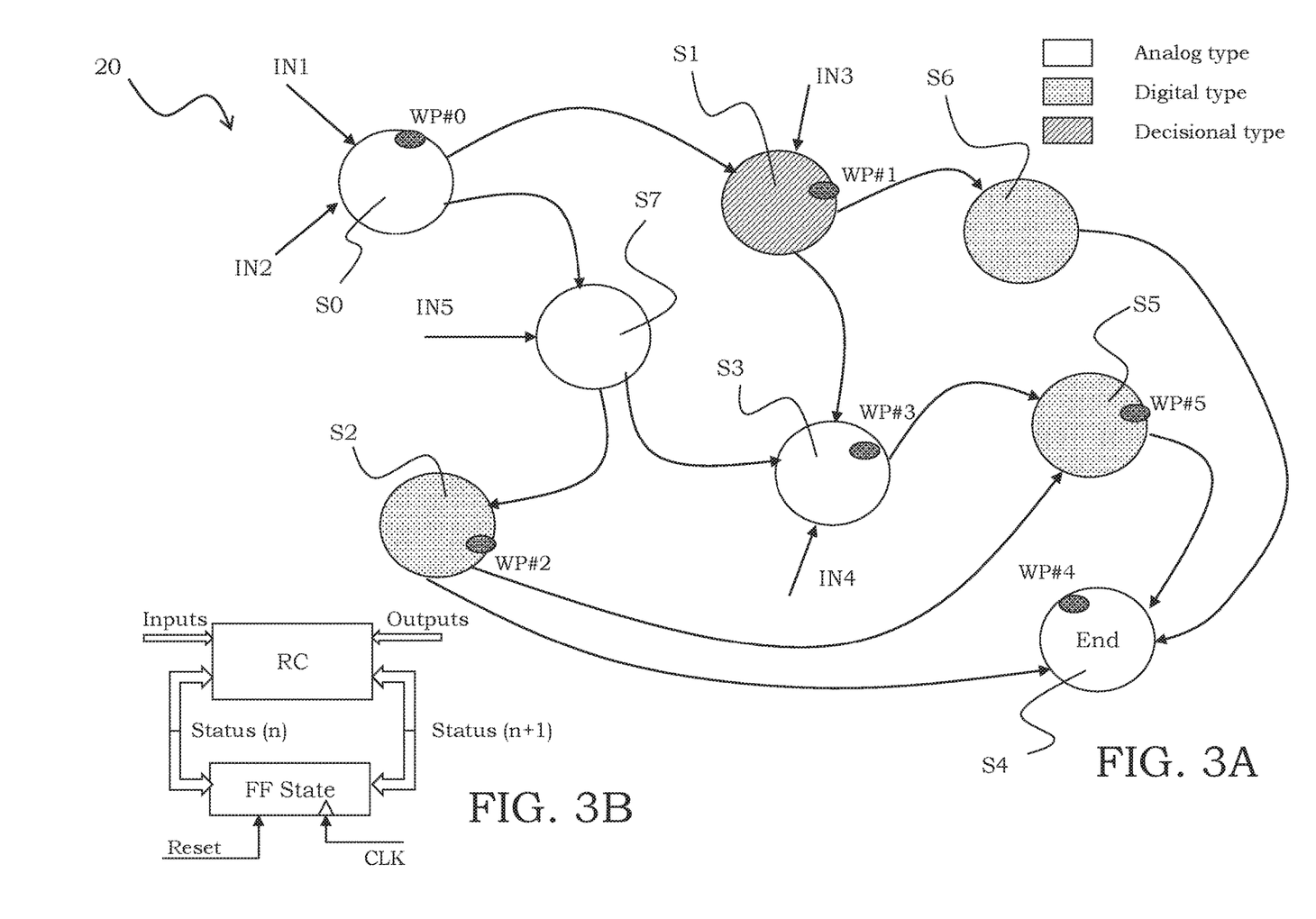
FIGS. 3A and 3B show block diagrams of a finite state machine implementing the method in accordance with an embodiment of the present disclosure.

The example finite state machine 20 of FIG. 3A thus comprises a plurality of states S1 . . . Sn interconnected by means of corresponding transitions.

The states S0 . . . Sn can be of the analog type, such as the first state S0 in the figure, of the decisional type, such as the second state S1 in the figure, or of the digital type, such as the third state S2 in the figure. The first state S0 also receive input values IN1 and IN2, being provided at the begin of the running of the finite state machine 20. The fifth state S4 correspond to an end state of the finite state machine 20.

Other states, such as the second state R1 or a fourth state S3 or an eighth state S7 could receive eventual additional input values, IN3, IN4 and IN5, being for instance analog timing or timeout signals, such additional input values being unpredictable, i.e. tied to actions that could occur randomly, as previously explained in relation to the example firmware 10 of FIG. 1.

According to an embodiment of the present disclosure, the method is applied to the finite state machine 20 and comprises a step of selecting a plurality of states of interest S0 . . . Sn, then associating a corresponding watchpoint WP #0 . . . WP #n to each of the selected state.

As for the firmware 10, also the watchpoints of the finite state machine 20 are suitably inserted during the design of the same in an automatic (for instance base on a list) or manual (for instance based on the design choices) manner during the generation of the finite state machine, in particular by means of a compiler and/or a tool generating the hardware code of the component/system running the finite state machine 20.

The working of the finite state machine 20 is schematically shown in FIG. 3B. In particular, a current status (n) is linked to a following status (n+1) by means of a combinatory network RC, the transitions between states being clocked by a clock signal CLK.

It is underlined that a status indicates the current working point of the finite state machine 20, in a similar manner as the program counter PC of the firmware 10.

Also for the finite state machine 20, cumulated HASH values (or FT_HASH) could be calculated by applying the HASH function to the status according to following formula:

$$HASH(\text{watchpoint WP } \#i) = HASH(\text{status})$$

As previously, the cumulated HASH values (or FT_HASH) are calculate by linking the HASH value of a watchpoint under examination (watchpoint WP #i) to the HASH value of the previous watchpoints according to the following formula:

$$FT\_HASH_k = HASH[FT\_HASH_{k-1} | HASH(\text{watchpoint WP } \#i)], \text{being}$$

k the current clock period;
k−1 the previous clock period; and
| the union between HASH values,
starting from an initial value $FT\_HASH_0 = HASH(\text{watchpoint WP } \#0)$, being watchpoint #0 the starting state.

Figure 4:
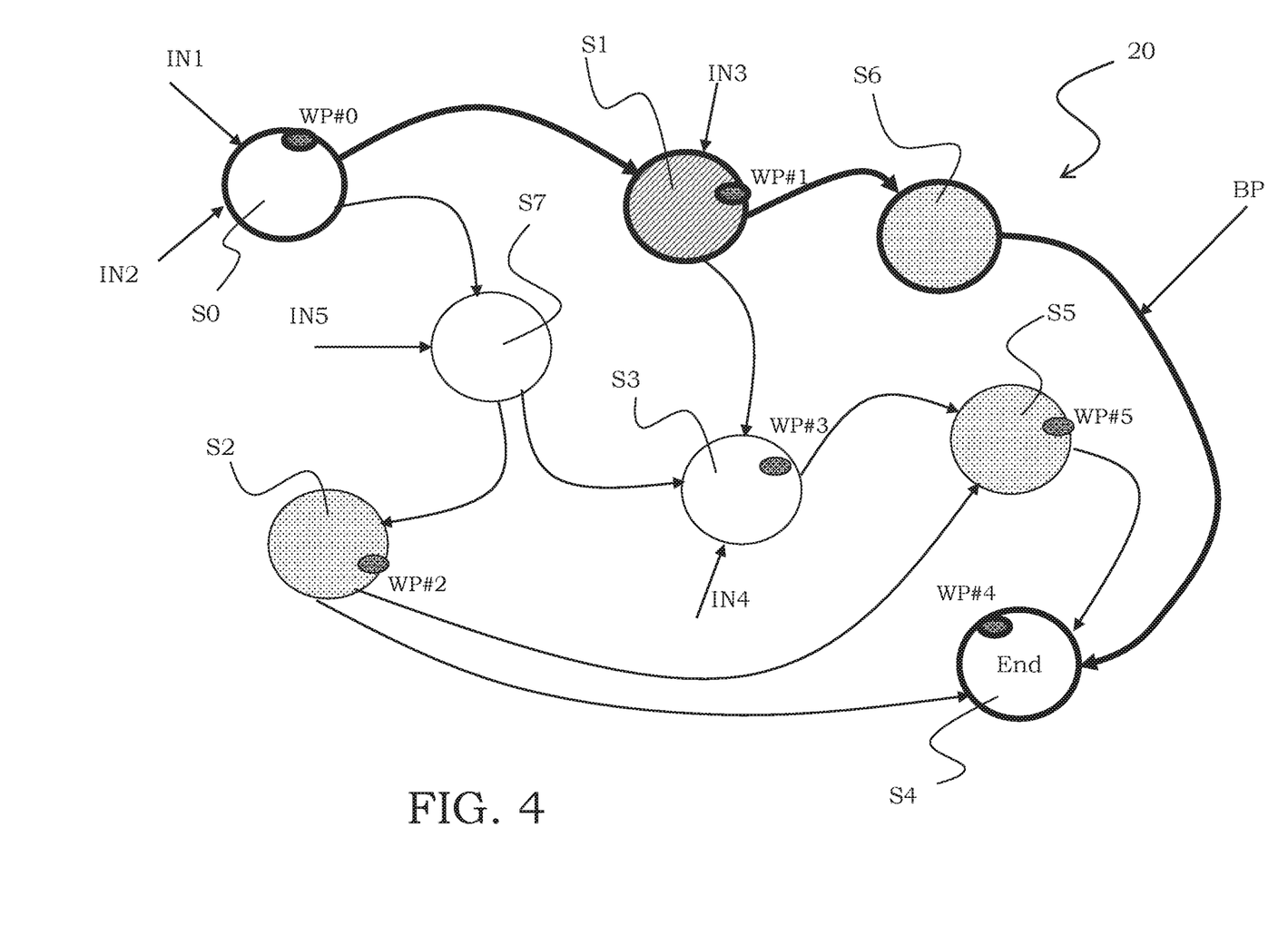
FIG. 4 shows a block diagram of the finite state machine of FIG. 3A showing a path being analyzed with the method in accordance with an embodiment of the present disclosure.

FIG. 4 shows an example path of states under examination in the finite state machine 20 of FIG. 3A. In particular, starting from an initial state S0, the FT_HASH value at the end state S4 following the bolded path BP is calculated as follows:

$$FT\_HASH_0 = HASH(\text{watchpoint WP } \#0)$$

$$FT\_HASH_1 = HASH(FT\_HASH_0 | HASH(\text{watchpoint WP } \#1))$$

$$FT\_HASH_2 = HASH(FT\_HASH_1 | HASH(\text{watchpoint WP } \#4))$$

$$E\text{-}HASH = FT\_HASH_2$$

According to the method of an embodiment of the disclosure, the current HASH value or E-HASH obtained at the fifth state S4 corresponding to the end state of the path BP under examination is then compared with the initial first or G-HASH value as calculated for the end state according to a correct working of the finite state machine 20.

In the example finite state machine of FIG. 3, the set of hashes allowed is:

$$G\_HASH = \{H1, H2, H3, H4, H5\} \text{ where:}$$

H1=HASH along the path→watchpoint WP #0, watchpoint WP #1, watchpoint WP #4, corresponding to the current E-HASH value as above calculated for the path under examination;

H2=HASH along the path→watchpoint WP #0, watchpoint WP #2, watchpoint WP #5, watchpoint WP #4

H3=HASH along the path→watchpoint WP #0, watchpoint WP #1, watchpoint WP #3, watchpoint WP #5, watchpoint WP #4

H4=HASH along the path→watchpoint WP #0, watchpoint WP #3, watchpoint WP #5, watchpoint WP #4

H5=HASH along the path→watchpoint WP #0, watchpoint WP #2, watchpoint WP #4

A current or E-HASH value being different from H1, . . . H5 indicates that a bad transition happened in the running of the finite state machine 20 and thus that an unwanted or even dangerous situation may occur.

The finite state machine 20 could be explored and the allowed set of HASH values can be calculated according to any known technique or graph visit algorithm.

Moreover, according to an alternative embodiment of the method, the not allowed HASH values could be also casted according to a policy of severity. In particular, a not allowed HASH value, corresponding to a not allowed path among the states of the finite state machine, could be indicated as simply erroneous or as illegal or even as dangerous. In such an event, an alert is provided so that a corrective action may be taken.

The set of initial first or G-HASH values is definable at each intermediate status of the finite state machine, so as to perform the check of the finite state machine several times (if needed) during the finite state machine evolution. In particular, the calculation of a new set of initial first or G-HASH values could be made before a critical command execution. For instance, considering a finite state machine executed in a vehicle, new set of initial first or G-HASH values are calculated before the brake or throttle activation.

It is newly remarked that the HASH function allow to collapse all the history of a watchpoint, i.e. the path followed in order to reach the state corresponding to such watchpoint in a value of a fixed length.

Figure 5:
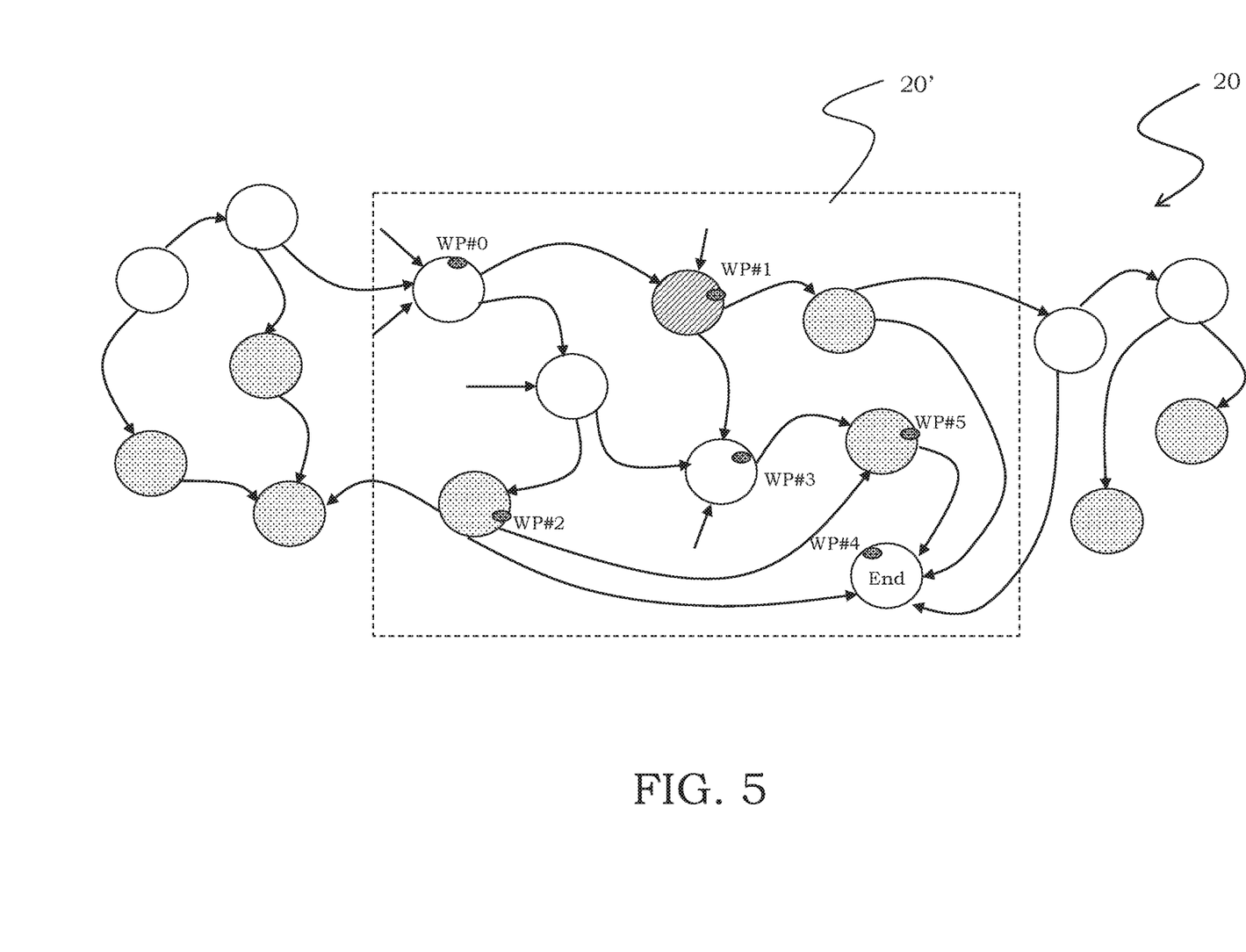
FIG. 5 shows a block diagram of a finite state machine including a sub-finite state machine implementing the method in accordance with an embodiment of the present disclosure.

The method can be also applied only in a portion of the finite state machine 20, in particular a sub-finite state machine or subnet 20' to monitoring only the eventual critical state transitions, as shown for instance in FIG. 5. In that case the initial watchpoint and the last watchpoint, in the example of FIG. 5 the watchpoints WP #0 and WP #4, are placed on the subnet 20' to be monitored.

Figure 6A:
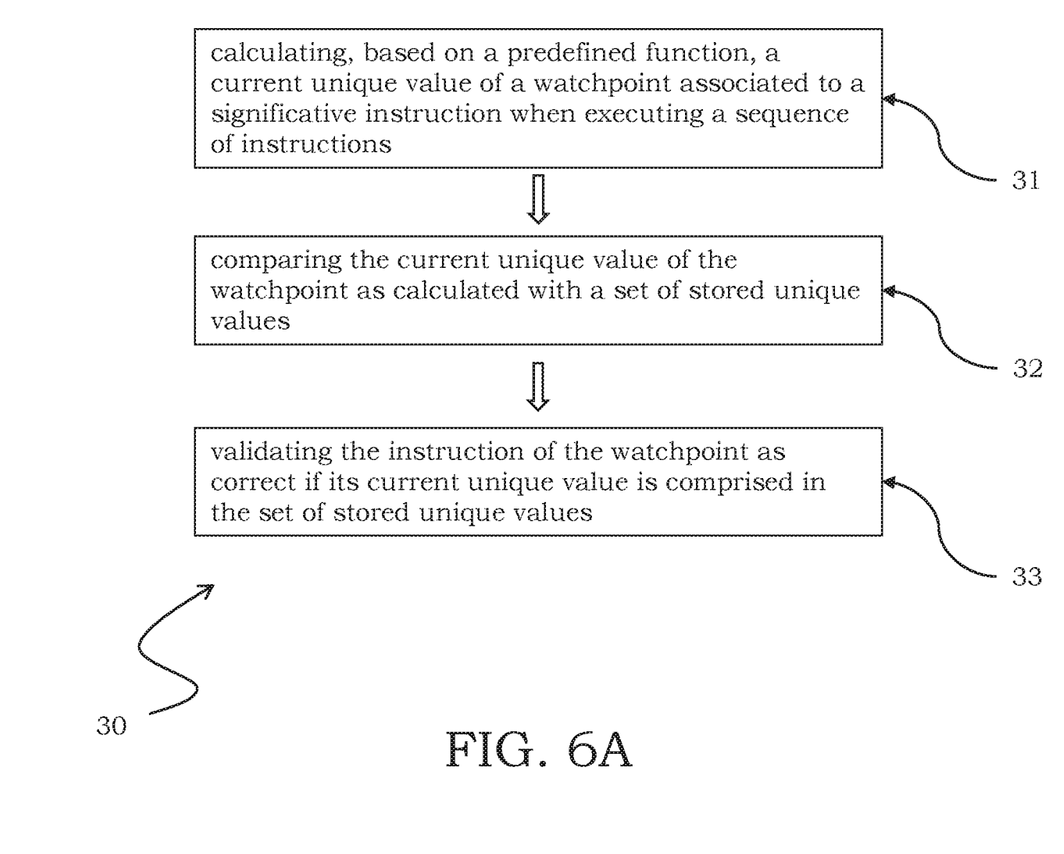
FIGS. 6A and 6B show methods in accordance with embodiments of the present disclosure.

FIG. 6A shows a block diagram of a method 30 according to an embodiment of the present disclosure.

Method 30 comprises, at step 31, calculating, based on a predefined function, a current unique value of a watchpoint associated to a significative instruction when executing a sequence of instructions. The calculating may include calculating a HASH function of the watchpoint and may be carried out by an HASH calculator, as described below. The watchpoint may correspond to an instruction of a firmware, as shown in FIGS. 1 and 2, or to a state of a finite state machine, as shown in FIGS. 3A-3B, 4 and 5.

Method 30 further comprises, at step 32, comparing the current unique value of the watchpoint as calculated with a set of stored unique values. The set of stored unique values may comprise unique values associated to all allowable paths in the sequence of instructions corresponding to a correct working of the sequence of instructions. The stored unique values may have been computed used the same predefined function of step 31, and the set of stored unique values may have been stored, e.g., in non-volatile memory. The operations of step 32 may be carried out by a comparator, for example a HASH comparator, as described below.

Method 30 further comprises, at step 33, validating the instruction of the watchpoint as correct if its current unique value is comprised in the set of stored unique values.

Validation may assert that a state of a finite state machine associated to the watchpoint is a valid state, following the current one, according to an initial programming of the finite state machine, i.e. an allowed state or that an instruction of a firmware following a current one is among the allowed instruction according to the correct sequence of instruction of the firmware.

In the event that the comparing of step 32 results in the current unique value is not comprised in the set of stored unique values, the validating results in asserting that the instruction of the firmware or the state of the finite state machine is incorrect; in such an event an alert is provided so that a corrective action may be taken. The validating may be carried out by a instruction/state validator, as described below.

Figure 6B:
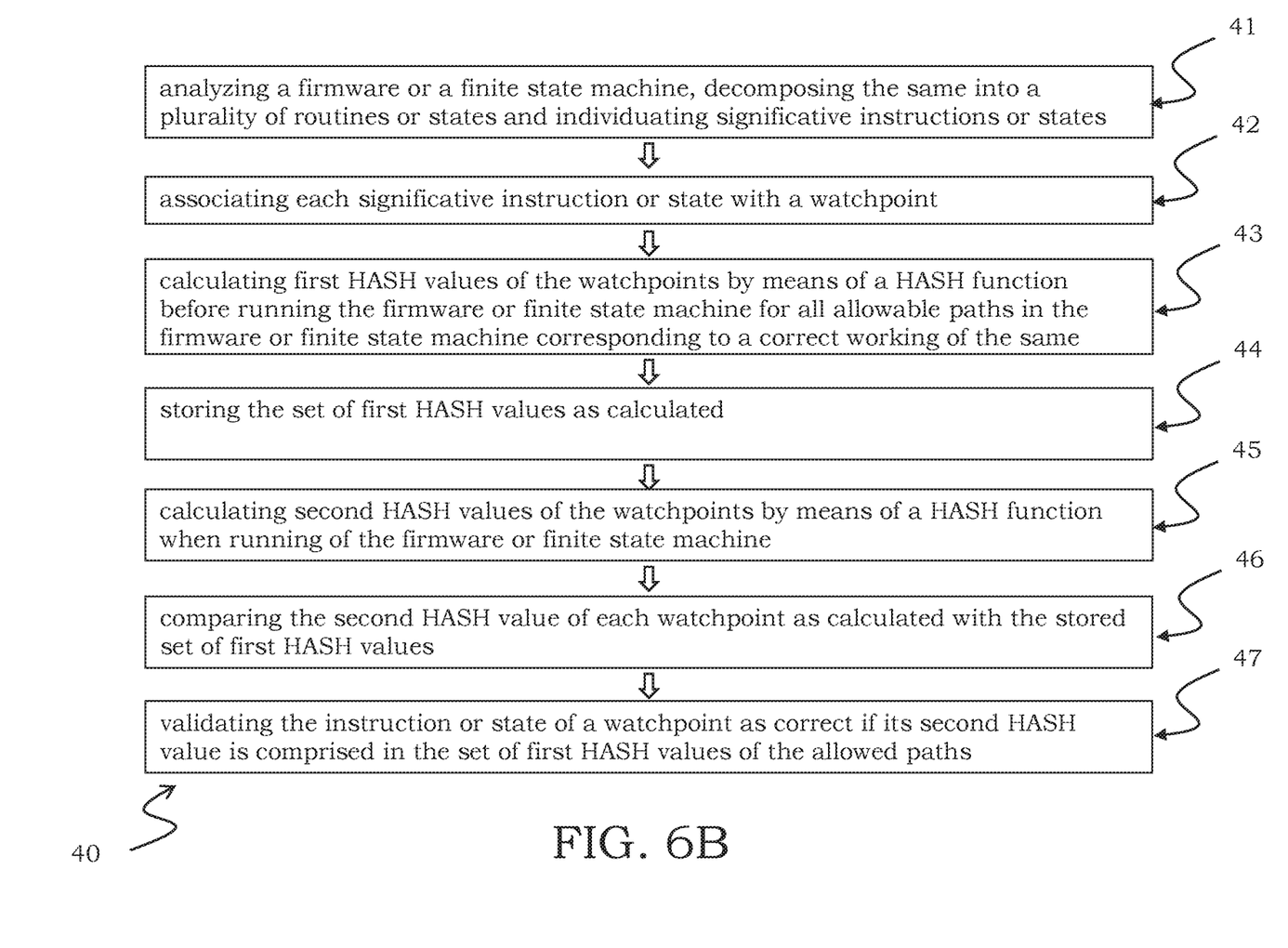

FIG. 6B shows a block diagram of a method 40 according to another embodiment of the present disclosure.

Method 40 comprises, at step 41, analyzing a firmware or a finite state machine, decomposing the same into a plurality of routines or states and individuating significative instructions or states and, at step 42, associating each significative instruction or state with a watchpoint.

Method 40 further comprises, at step 43, calculating first HASH values of the watchpoints by means of a HASH function before running the firmware or finite state machine for all allowable paths in the firmware or finite state machine corresponding to a correct working of the same.

Moreover, method 40 comprises, at step 44, storing the set of first HASH values as calculated. The set of first HASH values may be stored, e.g., in non-volatile memory.

Method 40 then comprises, at step 45, calculating second HASH values of the watchpoints by means of a HASH function when running of the firmware or finite state machine.

The calculating first and second HASH values of the watchpoints by means of the HASH function may be carried out by a HASH calculator, as described below.

Method 40 further comprises, at step 46, comparing the second HASH value of each watchpoint as calculated with the stored set of first HASH values. The comparing of step 46 may be carried out by a HASH comparator, as described below.

Method 40 further comprises, at step 47, validating the instruction or state of a watchpoint as correct if its second HASH value is comprised in the set of first HASH values of the allowed paths, i.e. an allowed state or that an instruction of a firmware following a current one is among the allowed instruction according to the correct sequence of instruction of the firmware.

In the event that the comparing of step 46 results in the second HASH value is not comprised in the stored set of first HASH values, the validating results in asserting that the instruction of the firmware or the state of the finite state machine is incorrect; in such an event an alert is provided so that a corrective action may be taken. The validating may be carried out by an instruction/state validator, as described below.

According to an embodiment of the present disclosure a component or system implementing the method for detecting bad firmware or finite state machine behaviors of a firmware or a finite state machine running in the component/system is provided.

For instance, a component could be a memory device associated with a microcontroller, usually provided with its own firmware managing the working of the memory device itself. Moreover, a system could be a home automation application running on a smartphone and receiving information from a plurality of sensors or a board comprising a plurality of electronic devices.

Such a simple component or more complex system, generally indicated as component, running a firmware or a finite state machine and implementing the above described method comprises means for calculating a HASH value corresponding to each watchpoint by means of a HASH function.

According to an embodiment of the disclosure, the means for calculating HASH values calculates first HASH values before running the firmware or finite state machine and second HASH values when running the firmware or finite state machine.

More particularly, the means for calculating HASH values could be comprised into a compiler and/or a tool generating the hardware code of the component or system.

The component or system also comprises storing means for storing the initial first or G-HASH values as calculated before the running of the firmware or finite state machine.

Suitably, the component or system also comprises means for comparing the stored initial first or G-HASH values and the current second or E-HASH value for each watchpoint and means for validating the instruction or state of a watchpoint as correct if its current second or E-HASH value is comprised in the initial first or G-HASH values of the allowed path starting from the watchpoint under examination.

Moreover, the component or system comprises means for calculating the cumulated HASH values as above indicated and an additional register to store the cumulated HASH values corresponding to all the already visited watchpoints of the firmware/FSM.

The component or system may further comprise suitable output means able to provide the result of the comparison between the G-HASH and E-HASH values, for instance in the form of a warning signal for a hypervisor or an user, when such a comparison has indicated a wrong or potentially dangerous sequence of instructions or states for the firmware or FSM under examination.

Figure 7A:
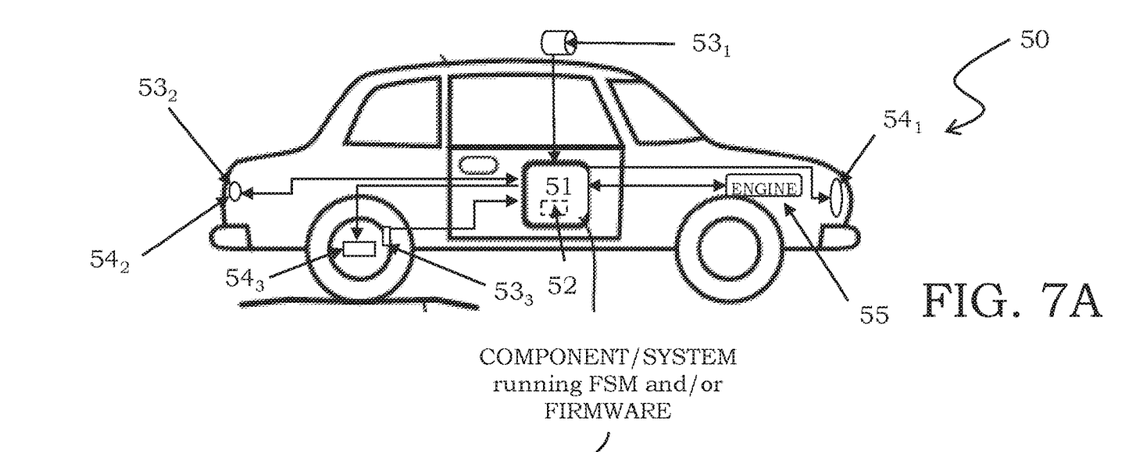
FIG. 7A shows an apparatus, namely a vehicle, comprising a component or system running a firmware or a finite state machine implementing a method in accordance with an embodiment of the present disclosure.
Figure 7B:
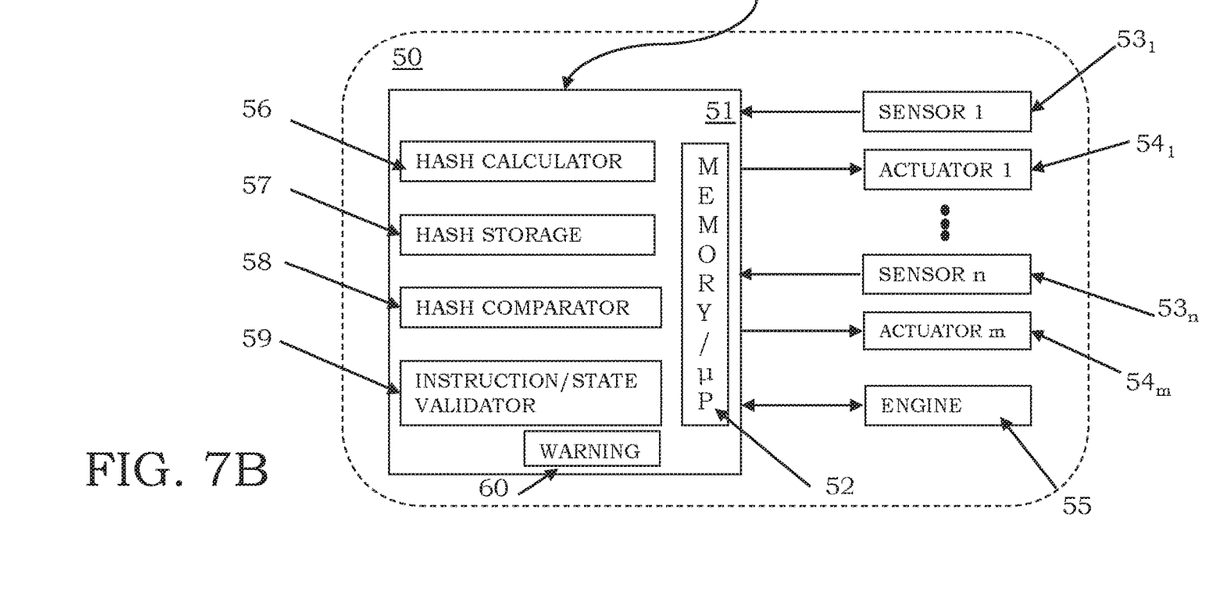
FIG. 7B shows a block diagram of the apparatus of FIG. 7A and of the component or system comprised therein.

An apparatus, namely a vehicle, comprising the component or system running a firmware or a finite state machine and implementing the above described method is schematically shown in FIG. 7A. A corresponding diagram block also showing the structure of the component/system is shown in FIG. 7B.

The apparatus 50, for instance a vehicle, comprises a component 51 running a firmware or a finite state machine stored in a microprocessor or a memory 52 as means for storing the firmware or finite state machine and implementing the above described method.

The apparatus 50 also comprises sensors, 53$_1$-53$_3$, and actuators, 54$_1$-54$_4$, as well as an engine 55. More particularly, the sensors, 53$_1$-53$_3$ are connected to the component 51 and provide thereto corresponding input signals. Similarly, the actuators, 54$_1$-54$_4$ are connected to the component 51 and receive therefrom corresponding control signals, being able to control the working of the actuator. Moreover, the engine 55 is connected to the component 51 and exchange control and powering signals with it in a bidirectional manner.

For instance, sensors may comprise a luminosity sensor 53$_1$ associated with a roof of the vehicle, a proximity sensor $53_2$ associated with a rear portion of the vehicle or a rotational sensor $53_3$ associated with the wheels of the vehicle.

Moreover, actuators may comprise front lights $54_1$, rear lights $54_2$ or wheel brake control $54_3$.

In a general manner, a plurality of sensor $53n$ and a plurality of actuator $54m$, as well as the engine 55, are connected to the component 51, as shown by the block diagram of FIG. 7B.

The component 51 may comprise a memory or a microprocessor 52 running the firmware or finite state machine and implementing the above described method.

The component 51 further comprises a HASH calculator 56 as means for calculating HASH values; more particularly, the HASH calculator 56 calculates first HASH values before running the firmware or finite state machine and second HASH values when running the firmware or finite state machine.

The component 51 comprises a HASH storage 57 as storing means for storing the initial first or G-HASH values as calculated before the running of the firmware or finite state machine.

Furthermore, the component 51 may comprise an instruction/state validator 59 as means for validating the instruction or state of a watchpoint as correct if its second HASH value is comprised in the set of first HASH values of the allowed paths.

Finally, the component 51 may comprise warning means 60 as output means providing the result of the comparison between the first and second HASH values in the form of a warning signal.

The HASH calculator and the HASH comparator, as well as the instruction/state validator and the warning means 60 may be electronic circuits, microprocessors or microcontrollers and/or portions of an electronic device or microprocessor/microcontroller; they may also be computer instructions stored in a computer-readable medium that may be executed by a controller or a computer.

The HASH storage 57 may be a memory, a memory portion of an electronic device or a database.

Summing up, the present disclosure provides that a method for evaluating a firmware or a finite state machine (FSM) to improve safety of a component or system running the same by detecting anomalous sequences of routines or states in such firmware or finite state machine during their execution that could potentially trigger wrong or inconsistent signals leading to potentially dangerous situations for the corresponding component or system.

The method provides for a safety methodology to check the run-time of the firmware or finite state machine of a component and/or system using:

Pure logic;

Analog components; and

Mixed analog/logic signals.

In this way, the method provides for a strong contribution to the ASIL, i.e. the Automotive Safety Integrity Level, a risk classification scheme defined by the ISO 26262, associated with a component, especially a memory device. It is in fact well known that using a memory is considered very weak by the safety standards, because the associated index of the memory is very bad; in other word, the memory devices are assumed and not reliable. Using the method as above described would overcome this problem.

Moreover, the method according to the present disclosure is an improved methodology to check the component and/or system life phases:

Power on

Secure update

Run-time

The method according to the present disclosure suitably uses the HASH functions and thus is able to avoid collision in un-intended branches, in particular when using the SHA 256. Suitably, compact the log data are obtained and thus not large log report are required. Also, the history of the execution steps to track the correct execution is reduced and linked as a chain, thanks to the calculation of the HASH value of a watchpoint under examination as linked to the HASH values of the previous watchpoints; in this regards, it should be further remarked that the path is uniquely determined because each watchpoint contributes to the HASH final value. Finally, the correctness of all the possible paths from the start point to an end point in a firmware/FSM are suitably traced.

In the preceding detailed description, reference is made to the accompanying drawings that form a part hereof, and in which is shown, by way of illustration, specific examples. In the drawings, like numerals describe substantially similar components throughout the several views. Other examples may be utilized, and structural, logical and/or electrical changes may be made without departing from the scope of the present disclosure.

Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense.

As used herein, "a," "an," or "a number of" something can refer to one or more of such things. A "plurality" of something intends two or more. As used herein, the term "coupled" may include electrically coupled, directly coupled, and/or directly connected with no intervening elements (e.g., by direct physical contact) or indirectly coupled and/or connected with intervening elements. The term coupled may further include two or more elements that co-operate or interact with each other (e.g., as in a cause and effect relationship).

Although specific examples have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. The scope of one or more examples of the present disclosure should be determined with reference to the appended claims, along with the full range of equivalents to which such claims are entitled.

The invention claimed is:

1. A method, comprising:

analyzing a firmware or a finite state machine;

decomposing the firmware or the finite state machine into a plurality of routines or states;

individuating significant instructions of the firmware or states of the finite state machine;

associating each significative instruction or state with a watchpoint;
calculating first HASH values of the watchpoints using a HASH function before running the firmware or finite state machine for all allowable paths in the firmware or the finite state machine corresponding to a correct working of the firmware or finite state machine;
storing the first HASH values as calculated;
calculating second HASH values of the watchpoints using a HASH function when running of the firmware or finite state machine;
calculating cumulated HASH values of a sequence of instructions or states by linking a HASH value of a watchpoint under examination to HASH values of previous watchpoints according to the following formula:

$$FT\_HASH_k = HASH[FT\_HASH_{k-1} | HASH(\text{watchpoint } \#i)], \text{ wherein:}$$

$FT\_HASH_k$ is a cumulated HASH value,
watchpoint WP #i is watchpoint under examination,
k is a current clock period,
k−1 is a previous clock period, and
| is a union between HASH values, and
wherein the cumulated HASH value is calculated by applying the HASH function at each step of the routines of the firmware or at each transition between states of the finite state machine;
comparing the second HASH value of each watchpoint as calculated with the stored first HASH values; and
validating the instruction or state of a watchpoint as correct if its second HASH value is comprised in the first HASH values of the allowable paths.

2. The method of claim 1, wherein the significative instructions or states are begin/end instructions of routines of the firmware or specific executions states of the finite state machine.

3. The method of claim 1, wherein calculating the first HASH values and calculating the second HASH values use a same HASH function.

4. The method of claim 1, wherein the HASH function is a cryptographic HASH function or Secure Hash Algorithm SHA-256.

5. The method of claim 1, wherein calculating the first HASH values is performed for the firmware during a compiling phase or for the finite state machine during a synthesis phase.

6. The method of claim 1, wherein comparing the second HASH value of each watchpoint as calculated with the stored first HASH values is made starting from the first watchpoint in the runtime of the firmware or finite state machine or from any watchpoint in debug and/or validation procedures of the firmware or finite state machine.

7. The method of claim 1, wherein the second HASH value of an end watchpoint of the sequence of instructions or states is the last cumulated HASH value as calculated.

8. The method of claim 1, further comprising:
storing the cumulated HASH values as calculated for each watchpoint being examined.

9. The method of claim 1, wherein the first and second HASH values of a watchpoint are calculated by using a program counter value of the corresponding instruction for a firmware or a status for a finite state machine.

10. The method of claim 1, wherein associating the significative instructions or states and the watchpoints is performed in an automatic manner based on a list during design of the firmware or finite state machine.

11. The method of claim 1, wherein associating the significative instructions or states and the watchpoints is performed in a manual manner based on design choices during design of the firmware or finite state machine.

12. An apparatus, comprising:
a microprocessor configured to run firmware or a finite state machine;
a memory configured to store the firmware or finite state machine;
a plurality of sensors connected to the microprocessor and configured to provide thereto input signals; and
a plurality of actuators connected to the microprocessor and configured to receive therefrom control signals;
wherein the microprocessor is configured to:
calculate first HASH values associated to watchpoints of significative instructions or states of the firmware or finite state machine using a HASH function;
calculate second HASH values when the firmware or finite state machine is running;
store the first HASH values;
calculate cumulated HASH values of a sequence of instructions or states by linking a HASH value of a watchpoint under examination to HASH values of previous watchpoints according to the following formula:

$$FT\_HASH_k = HASH[FT\_HASH_{k-1} | HASH(\text{watchpoint } \#i)], \text{ wherein:}$$

FT_HASH is a cumulated HASH value;
watchpoint WP #i is the watchpoint under examination;
k is a current clock period;
k−1 is a previous clock period; and
| is a union between HASH values,
calculate the cumulated HASH value by applying the HASH function at each step of routines of the firmware or at each transition between states of the finite state machine;
compare the second HASH value of each watchpoint as calculated with the stored first HASH values; and
validate an instruction or state of a watchpoint as correct if its second HASH value is comprised in the first HASH values.

13. The apparatus of claim 12,
further comprising a register, wherein the register is configured to:
store the cumulated HASH values corresponding to all already visited watchpoints of the firmware or finite state machine.

14. The apparatus of claim 12, further comprising:
a compiler or a tool generating a hardware code for the microprocessor.

15. The apparatus of claim 12, wherein the microprocessor is configured to:
provide a result of a comparison between the first and second HASH values as a warning signal, when such a comparison has indicated a wrong or potentially dangerous sequence of instructions or states for the firmware or finite state machine of the microprocessor.

16. The apparatus of claim 12, wherein the microprocessor is included in one of: a vehicle, an airplane, or a control system of a plant.

17. A method, comprising:
analyzing a sequence of instructions and individuating significative ones;
associating each significative instruction with a watchpoint;

calculating first unique values of the watchpoints by using a predefined function before executing the sequence of instructions for all allowable paths in the sequence of instructions corresponding to a correct working of a component executing the sequence of instructions;

storing the first unique values as calculated;

calculating second unique values of the watchpoint using a predefined function when executing the sequence of instructions;

calculating cumulated unique values of the sequence of instructions by linking a unique value of a watchpoint under examination to unique values of previous watchpoints according to the following formula:

$$FT\_HASH_k = HASH[FT\_HASH_{k-1} | HASH(\text{watchpoint } \#i)], \text{ wherein:}$$

FT_HASH is a cumulated unique value, watchpoint WP #i is watchpoint under examination, k is a current clock period, k−1 is a previous clock period, and

| is a union between unique values, and wherein the cumulated unique value is calculated by applying the predefined function at each step of the sequence of instructions;

comparing the second unique value of each watchpoint as calculated with the stored first unique values; and validating the instruction of a watchpoint as correct if its second unique value is comprised in the first unique values of the allowable paths.

18. The method of claim 17, wherein calculating the first unique values and calculating the second unique values use a same predefined function.

19. The method of claim 17, wherein the sequence of instructions is a plurality of routines or states of a firmware or a finite state machine and the predefined function is a HASH function.

\* \* \* \* \*